United States Patent Office 3,293,968
Patented Dec. 27, 1966

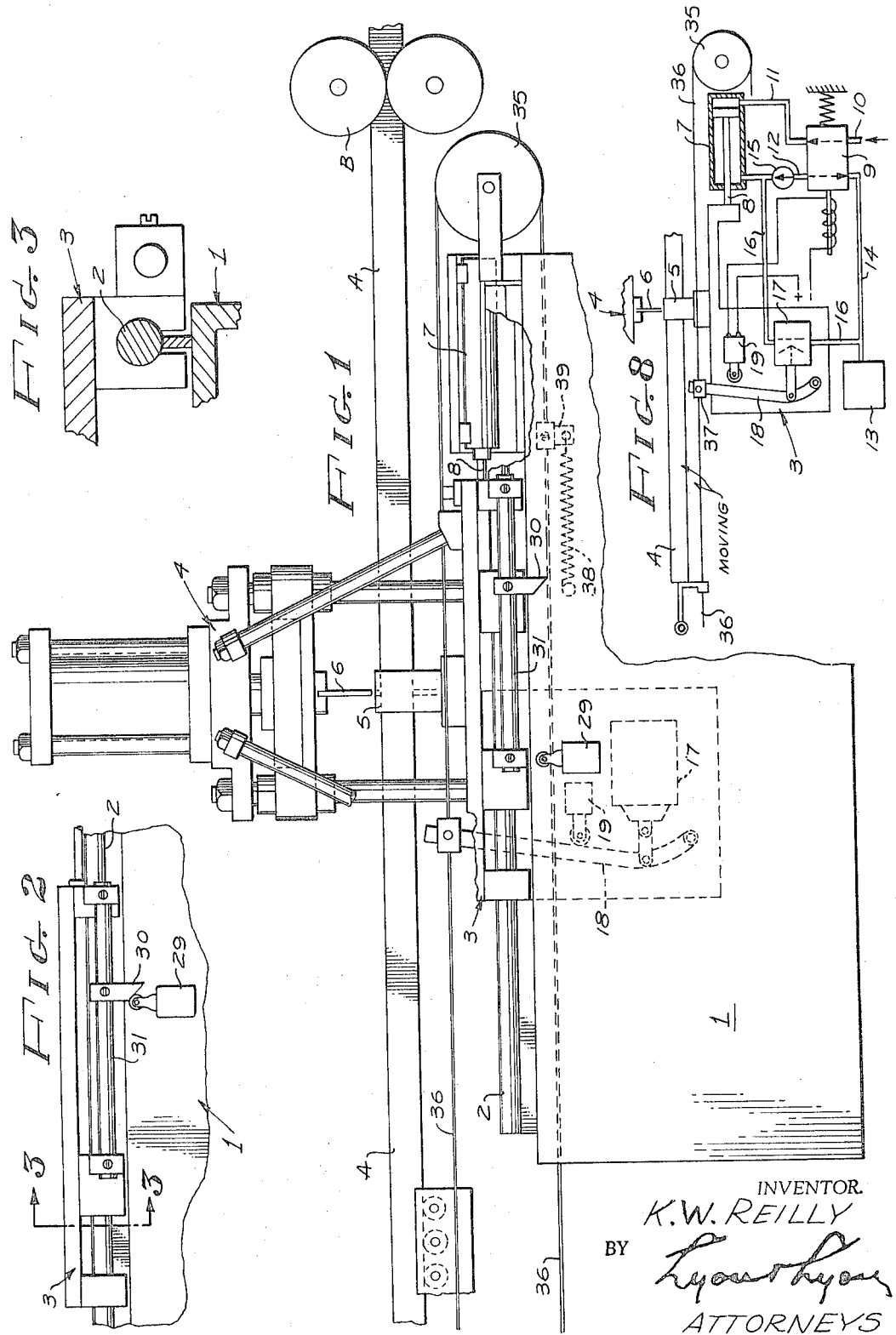

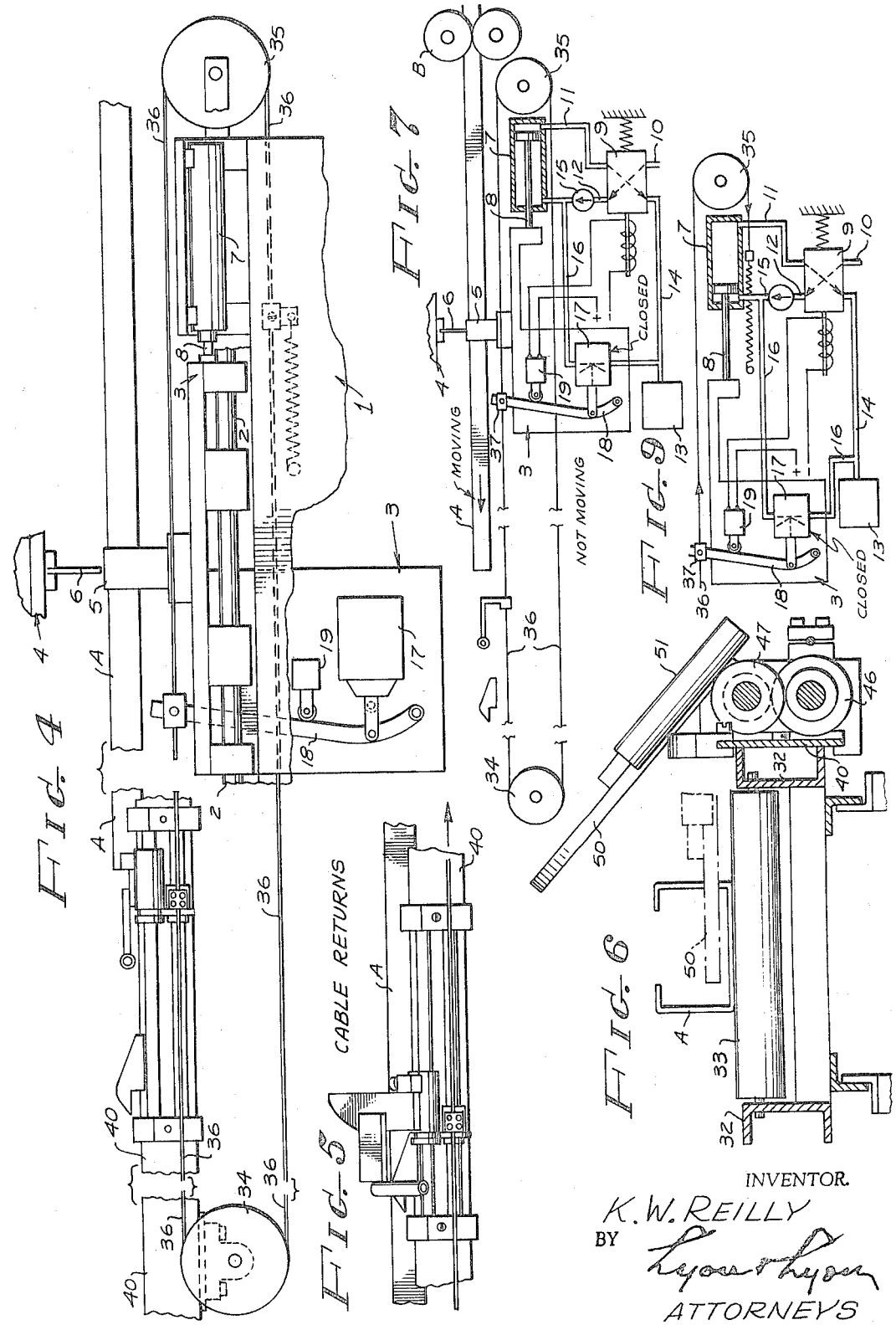

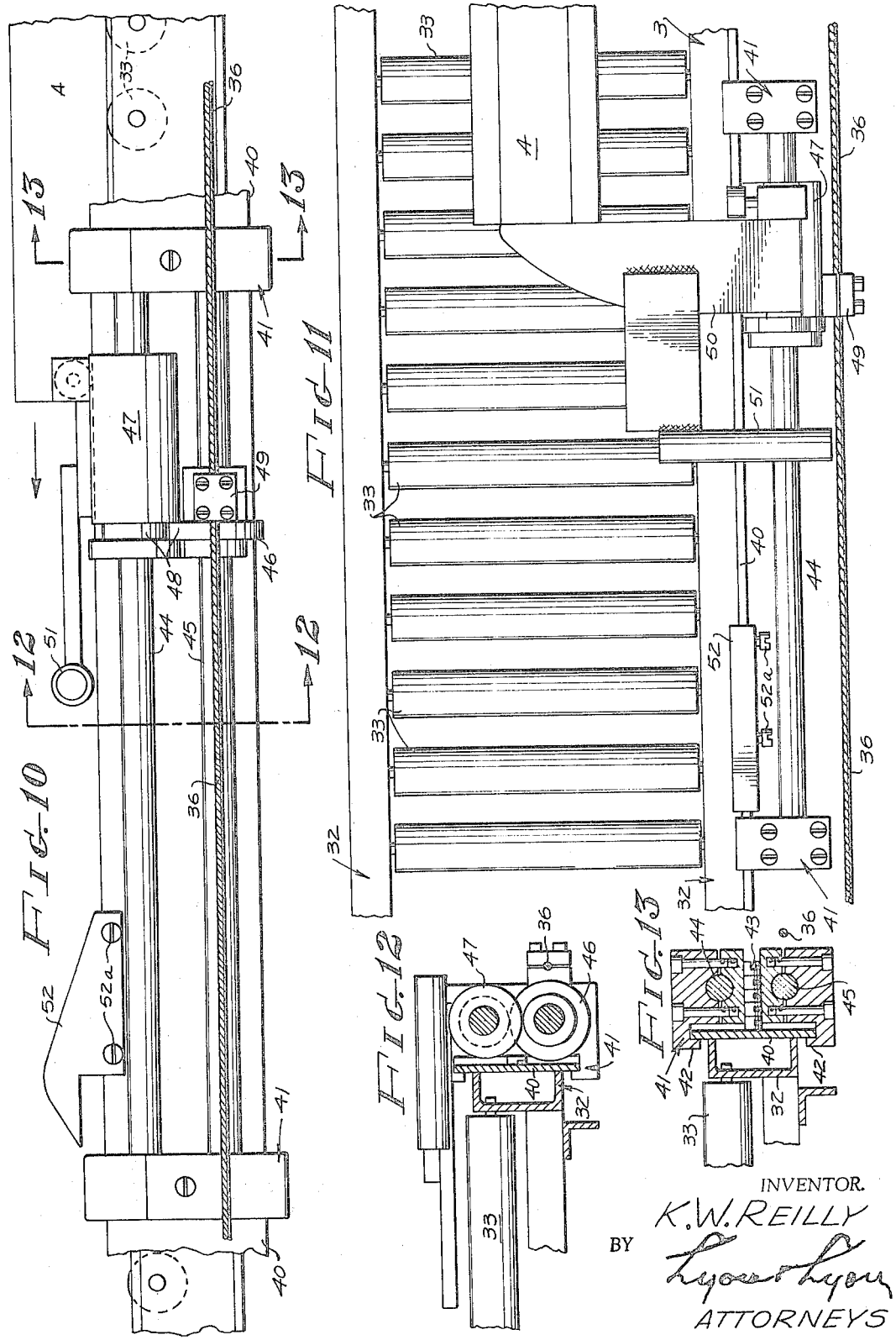

1

3,293,968
AUTOMATIC FLYING SHEARS
Kenneth William Reilly, 7827 Dunbarton Ave.,
Los Angeles, Calif. 90016
Filed July 19, 1965, Ser. No. 473,048
5 Claims. (Cl. 83—295)

This invention relates to automatic flying shears, that is, to apparatus for shearing or otherwise cutting to predetermined length extruded, roller, or otherwise formed continuously moving stock. Included in the objects of this invention are:

First, to provide an automatic flying shears wherein the extended end of a continuously moving work member is caused to engage a target which, in turn, causes corresponding movement of a control means, which actuates a valve and drive cylinder to set a shear supporting carriage in motion and accelerate the carriage to the velocity at which the work member is travelling and thereafter maintain the carriage at a synchronous velocity until the shearing operation is completed, whereupon the carriage is released for return travel to its initial position.

Second, to provide an automatic shear of this type wherein the target engaged by the material being cut offers minimal resistance; the energy required to accelerate and maintain the shear in motion being separately supplied, so that the flying shear does not interfere with movement of the material, thus permitting the severing without damage of material which may be unable to withstand substantial end load.

Third, to provide an automatic flying shear which incorporates a simple yet dependable control means for maintaining the shear at a speed synchronous with the work member to insure a clean and accurate cut.

Fourth, to provide an automatic mechanism which, while particularly adapted for the operation of a shear, is also adapted to operate other severing tools such as saw blades, abrasive cut-off wheels or the like.

With the above and other objects in view as may appear hereinafter, reference is directed to the accompanying drawings in which:

FIGURE 1 is a fragmentary side view of the automatic flying shears.

FIGURE 2 is a fragmentary side view thereof showing particularly the switch and cam means which initiates the shearing operation.

FIGURE 3 is an enlarged fragmentary sectional view taken through 3—3 of FIGURE 1.

FIGURE 4 is a fragmentary side view similar to FIGURE 1 showing the machine in its initial condition when first engaged by the material to be cut.

FIGURE 5 is a fragmentary side view showing particularly the target mechanism engaged by the material to be cut at the instant the target mechanism moves clear of the material.

FIGURE 6 is a transverse sectional view thereof taken through 6—6 of FIGURE 5.

FIGURE 7 is a diagrammatical view showing the control means before the target mechanism is engaged by the material to be cut corresponding to the condition shown in FIGURE 4.

FIGURE 8 is a similar diagrammatical view showing the control means at the beginning of its return stroke, this being the condition corresponding to that shown in FIGURES 5 and 6.

FIGURE 9 is a diagrammatical view showing the control mechanism at an intermediate stage of its operating stroke.

FIGURE 10 is an enlarged fragmentary side view showing particularly, the target mechanism and its supporting slide, the parts being shown in the position at which they are initially engaged by the material to be cut.

2

FIGURE 11 is a fragmentary plan view, at a reduced scale, but otherwise corresponding to FIGURE 10.

FIGURE 12 is a fragmentary transverse sectional view taken through 12—12 of FIGURE 10.

FIGURE 13 is a transverse sectional view taken through 13—13 of FIGURE 10.

The automatic flying shears are mounted on a fixed base structure 1. A pair of slide bars 2 are fixed to the upper side of the base structure and serve to support a carriage 3 for limited reciprocable movement. The carriage structure straddles the path of movement of the material A to be cut after its discharge from forming dies or rollers B. The carriage supports a shear structure 4 including a conventional die 5 and a shear blade 6. If the shear is used to cut extruded or roller-formed material, the die 5 is provided with a die aperture corresponding to the cross section of the material so that the material may be cut without deformation.

Mounted on the base structure 1 is a hydraulic drive unit 7 comprising a piston and cylinder, the piston being connected by a shaft 8 to the carriage 3.

Associated with the hydraulic drive unit 7 is a four-way valve 9, to which is connected a pressure line 10 and which in turn is connected to the two ends of the drive unit 7 by flow lines 11 and 12.

The flow lines 11 and 12 function to supply pressure fluid to effect the drive stroke and the return stroke respectively, performed by the hydraulic drive unit 7. A reservoir 13 is connected to the four-way valve through a flow line 14.

Interposed in the flow line 12 is a check valve 15. Connected to the flow line 12 and the check valve 15 is a bypass line 16 which extends to the reservoir 13. Interposed in the bypass line 16 is a speed regulating valve 17 carried by the carriage 3.

Pivotally mounted on the carriage 3 at one end, is a control lever 18 which is mechanically connected to the valve 17 so as to regulate flow therethrough. Also mounted on the carriage 3 and positioned for engagement by the control lever 18 is an actuating switch 19, which operates a solenoid connected with the four-way valve 9 so as to move the valve from one extreme position to the other.

Mounted on the base structure 1 is a shear actuating switch 29 which is engaged by a cam 30, adjustably mounted on a bar 31 supported from the carriage 3.

Positioned beyond one end of the base structure 1 is a conveyor frame 32 having conveyor rollers 33. Secured to the conveyor frame 32 is a pulley 34 and secured to the remote end of the base structure 1 is a pulley 35. A control cable 36 extends between and is wrapped about the pulleys 34 and 35.

Attached to the upper reach of the control cable 36 is a clamp 37 which is attached to the control lever 18. A return spring 38 is joined to the lower reach of the cable 36 by a clamp 39. The other end of the spring is anchored to the base structure. The spring tends to move the upper reach of the cable in opposition to the direction of movement of the material to be cut.

Secured at one side of the conveyor 32 is a mounting plate 40, on which is adjustably mounted a pair of brackets 41 having lips 42 which overlap the upper and lower margins of the mounting plate. Locking screws 43 carried by the brackets secure the brackets to the mounting plate.

The brackets 41 support upper and lower slide bars 44 and 45. The lower slide bar carries a slide spool 46. The upper slide bar carries an upper slide spool 47. The two slide spools are interconnected by rib and groove means 48 so that the two slide spools are interconnected to slide in unison on the slide bars 44 and 45.

The lower slide spool 46 is provided with a cable clamp 49 attached to the upper reach of the control cable 36. Secured to the upper slide spool 47 is a target arm 50 which projects over the conveyor rollers 33 in position for engagement by the material to be sheared. The target arm 50 is pivoted about the axis of the upper slide spool 47 to an upper position clearing the material to be cut, as indicated by solid lines in FIGURE 6. Projecting laterally from the target arm 50 is a cam follower 51 which engages a cam 52 for the purpose of raising the target arm clear of the material to be cut. The cam 52 is slidably adjustable on the mounting plate 40, and locked in place by set screws 52a.

Operation of the automatic flying shears is as follows:

The control cable, under urge of the spring 38 tends to move the control lever 18 clockwise as viewed in FIGURES 1, 4, 7, 8 and 9. Clockwise movement of the control lever closes the speed regulating valve 17 and may either open or close the switch 19 which moves the four-way valve 9 to one of its extreme positions.

The return spring 38 moves the target arm 50 to the right as viewed in FIGURES 4, 5, 10 and 11; that is, in a direction opposite to the movement of the material to be cut.

The material A extends through the die drive B and extreme end of the material engages the target arm 50 so as to move the target arm to the left as viewed in FIGURES 4, 5, 10 and 11. This movement turns the control lever 18 in a counter-clockwise direction, first causing the switch 19 to open or close as the case may be so as to supply pressure fluid to the right-hand end of the hydraulic drive unit 7 causing the carriage to move in the same direction as the material A.

Initially, the carriage tends to move faster than the material; but in doing so, the control lever is urged clockwise to restrict the flow through the speed reducing valve 17. As a consequence, the control lever 18 quickly assumes a position in which the flow through the speed regulating valve 17 is adjusted so that the speed of the carriage is brought into exact unison with the speed at which the materal A is moving. This may be accomplished within a few inches or fraction of an inch of travel. The cam 30 is so adjusted that after initial travel calculated to insure that the carriage is moving in synchronism with the material to be cut, the switch 29 is closed so as to cause operation of the shear structure 4.

After the shearing operation is completed, the piece which has been cut from the material A continues to move forward until the target arm 50 is deflected upwardly by action of the cam 52 and cam follower 51. When the target arm 50 has been tilted to a position clearing the material A, this being the solid line shown in FIGURE 6, the clamp and target arm are free to move to the right as viewed in the figures. This action of the control cable causes the position of the four-way valve 9 to be reversed and to shut off the speed regulating valve 17 so that the carriage moves through its return stroke to its initial position. The target arm is now ready for engagement by the new end of the material A so that the operation may be repeated.

A comparatively short length of travel of the carriage is required in order to effect the shearing operation. The material may be cut to any desired length merely by adjusting the location of the brackets 41 and structure carried thereby.

It will be noted that the target arm 50 may be freely movable so as to require a minimal amount of force applied by the material A. As a consequence, the material A may be of relatively thin cross section and relatively weak. Movement of the target arm merely serves to control the movement of the carriage, the force being supplied by the hydraulic drive unit 7.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. An automatic severing means for material issuing and moving linearly from a continuous forming machine, said means comprising:
    (a) a reciprocable carriage movable along an axis parallel to the axis of movement of said material;
    (b) a severing tool for said material carried by said carriage;
    (c) variable speed means for moving said carriage including a speed adjusting means to effect movement of said carriage within a speed range extending from a rate below the speed of said material to a rate above the speed of said material;
    (d) a target engaged by said material and movable therewith, said target being connected with said speed adjusting means to bring the rate of movement of said carriage into coincidence with the rate of movement of said material;
    (e) means operable when the rates of movement of said carriage and material are equal to activate said severing means;
    (f) and means for deflecting said target from the path of said material after operation of said severing means.

2. An automatic severing means for material issuing and moving linearly from a continuous forming machine, said means comprising:
    (a) a reciprocable carriage movable along an axis parallel to the axis of movement of said material;
    (b) a severing tool for said material carried by said carriage;
    (c) a hydraulic power unit for moving said carriage;
    (d) a valve for causing said power unit to reciprocate said carriage;
    (e) a speed regulating valve mounted on said carriage for controlling said carriage, when moving in unison with said material, within a speed range having a high value above the rate of movement of said material and a low value below the rate of movement of said material;
    (f) a target engaged by the previously severed end of said material to move in unison therewith;
    (g) means interconnecting said target and said speed regulating valve to cause said carriage to move at the same rate of movement as said material;
    (h) means operable, when the rates of movement of said carriage and material are equal, to activate said severing means;
    (i) and cams means for deflecting said target from the path of said material.

3. An automatic severing means for material issuing and moving linearly from a continuous forming machine, said means comprising:
    (a) a reciprocable carriage movable along an axis parallel to the axis of movement of said material;
    (b) a severing tool for said material carried by said carriage;
    (c) a hydraulic piston and cylinder power unit for driving said carriage;
    (d) a speed regulating valve mounted on said carriage for controlling said power unit to move said carriage in a range between a rate above and a rate below the rate of movement of said material;
    (e) an operating arm for adjusting said speed regulating valve;
    (f) a target engageable by a previously severed end of said material;
    (g) a connecting member between said target and said operating arm for moving said operating arm to increase the rate of movement of said carriage when said carriage is moved at a rate slower than said material, and to decrease the rate of movement of said carriage when said carriage is moved at a rate faster than said material, thereby to adjust the rate of movement of said carriage into coincidence with the rate of movement of said material;
(h) means operable, when the rates of movement of said carriage and material are equal, to activate said severing means;
(i) means for displacing said target clear of said material after a length thereof has been severed;
(j) and means operable after said displacing means to return said target and carriage to a predetermined starting position.

4. An automatic severing means for material issuing and moving linearly from a continuous forming machine, said means comprising:
(a) a fixed base structure;
(b) a carriage mounted thereon for limited reciprocation thereon along an axis parallel to the axis of movement of said material between an initial and a final position;
(c) means interconnecting said base structure and carriage to effect reciprocation thereof;
(d) means for regulating the rate of travel of said carriage from said initial to said final position within a speed range bracketing the rate of travel of said material;
(e) a target member normally occupying an initial position and engageable by said material for movement toward a final position;
(f) cam means operable, as said target member approaches its final position, to free said target member from said material;
(g) means interconnecting said target member and said regulating means operable when said target is engaged by said material to increase the rate of travel of said carriage, when lower than the rate of travel of said material and to decrease the rate of travel of said carriage when higher than the rate of travel of said material thereby to cause the carriage to move in unison with said material;
(h) means for operating said severing means when the carriage and material are moving in unison;
(i) and means operable when said target is free to return said target to its initial position and cause said carriage to return to its initial position.

5. An automatic severing means for material, issuing and moving linearly from a continuous forming machine, said means comprising:
(a) a target guide mounted parallel to the path of said material;
(b) a target engageable by said material and freely movable on said guide;
(c) a spring biased cable urging said target toward a starting position for engagement by the end of a continuous length of material issuing from said machine;
(d) means operable, when said material has been moved a predetermined distance by said material to move said target clear of the material;
(e) a carriage mounted for movement parallel to the path of said material and between said target and said machine;
(f) hydraulic means for moving said carriage including a control valve;
(g) means connected to said cable for movement in unison with said target for operating said control valve, thereby to move said carriage in union with said target and said material;
(h) and means carried by said carriage for severing said material when said carriage is moving in unison therewith.

References Cited by the Examiner
UNITED STATES PATENTS

| | | | |
|---|---|---|---|
| 587,363 | 8/1897 | Edwards | 83—295 |
| 1,946,926 | 2/1934 | Barton | 83—295 X |
| 2,271,145 | 1/1942 | McKinney | 83—295 |
| 3,039,138 | 6/1962 | Hall et al. | 83—295 X |
| 3,175,381 | 3/1965 | Hawkins et al. | 83—295 X |

WILLIAM W. DYER, Jr., *Primary Examiner.*

J. M. MEISTER, *Assistant Examiner.*